United States Patent
Kim

(10) Patent No.: US 9,665,268 B2
(45) Date of Patent: May 30, 2017

(54) MOBILE TERMINAL AND CONTROL METHOD THEREOF

(71) Applicant: LG Electronics Inc., Seoul (KR)

(72) Inventor: Moonjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/523,583

(22) Filed: Oct. 24, 2014

(65) Prior Publication Data

US 2015/0113433 A1    Apr. 23, 2015

Related U.S. Application Data

(63) Continuation of application No. 13/546,955, filed on Jul. 11, 2012, now Pat. No. 8,904,291.

(30) Foreign Application Priority Data

Apr. 27, 2012  (EP) ..................... 12002998

(51) Int. Cl.
*G06F 3/0488* (2013.01)
*G06F 3/0481* (2013.01)
(Continued)

(52) U.S. Cl.
CPC .......... *G06F 3/0488* (2013.01); *G06F 3/0481* (2013.01); *G06F 3/04845* (2013.01);
(Continued)

(58) Field of Classification Search
CPC ................................................. G06F 3/04842
(Continued)

(56) References Cited

U.S. PATENT DOCUMENTS

2007/0022158 A1   1/2007 Vasa et al.
2009/0249235 A1  10/2009 Kim et al.
(Continued)

FOREIGN PATENT DOCUMENTS

CN      1596535      3/2005
CN    101267630      9/2008
(Continued)

OTHER PUBLICATIONS

Simpleaf free (version 1.2.0, released as late as Apr. 23, 2012).*
(Continued)

*Primary Examiner* — David Choi
(74) *Attorney, Agent, or Firm* — Lee Hong Degerman Kang & Waimey

(57) ABSTRACT

A mobile terminal and a control method thereof are provided. The mobile terminal comprises a wireless communication unit, a display (151) configured to display an image, and a controller configured to display a first input area overlapping with at least part of the image in response to a first touch applied to the display (151) and to transmit data based on a touch trace corresponding to a second touch of a user, which is acquired through the displayed first input area, to a client terminal (200, 300) including one or more other terminals through the wireless communication unit in real time, the first input area having translucent property to allow the overlap image to be recognized. According to the present invention, data corresponding to a touch applied to an input area can be transmitted to a client terminal to achieve each data exchange.

19 Claims, 33 Drawing Sheets

(51) Int. Cl.
*G06F 3/0484* (2013.01)
*H04M 3/56* (2006.01)
*H04M 1/725* (2006.01)

(52) U.S. Cl.
CPC .... *G06F 3/04883* (2013.01); *H04M 1/72555* (2013.01); *H04M 3/567* (2013.01); *H04M 1/7253* (2013.01)

(58) Field of Classification Search
USPC .......................................................... 715/748
See application file for complete search history.

(56) References Cited

U.S. PATENT DOCUMENTS

| | | | |
|---|---|---|---|
| 2009/0273612 A1* | 11/2009 | Xie ................. | 345/630 |
| 2010/0031202 A1 | 2/2010 | Morris et al. | |
| 2010/0031203 A1 | 2/2010 | Morris et al. | |
| 2010/0188474 A1 | 7/2010 | Robinson et al. | |
| 2010/0295805 A1* | 11/2010 | Shin et al. ..................... | 345/173 |
| 2010/0302172 A1* | 12/2010 | Wilairat ........................ | 345/173 |
| 2011/0041086 A1* | 2/2011 | Kim et al. .................... | 715/764 |
| 2011/0134028 A1 | 6/2011 | Hiroshima et al. | |
| 2011/0157028 A1 | 6/2011 | Stallings et al. | |
| 2011/0208807 A1 | 8/2011 | Shaffer | |
| 2012/0229399 A1* | 9/2012 | Kobayashi et al. .......... | 345/173 |
| 2012/0281020 A1 | 11/2012 | Yamamoto et al. | |
| 2013/0167059 A1* | 6/2013 | Legris ........................... | 715/769 |
| 2013/0290866 A1* | 10/2013 | Kim .............................. | 715/748 |

FOREIGN PATENT DOCUMENTS

| | | |
|---|---|---|
| CN | 102109954 | 6/2011 |
| CN | 102187325 | 9/2011 |
| EP | 1538819 | 6/2005 |
| GB | 2450160 | 12/2008 |
| WO | 2011/081088 | 7/2011 |

OTHER PUBLICATIONS blotter—Sep. 11, 2011.*
"AllJoyn App—WhiteBoard: Enabling collaborative drawing through AllJoyn P2P technology", XP55037588, Apr. 6, 2012.
"Windows Netmeeting", XP002302481, Apr. 2003.
European Patent Office Application Serial No. 12002998.8, Search Report dated Oct. 19, 2012.
Simpleaf free (version 1.2.0, released as late as Apr. 23, 2012, 15 pages.
Shimpi, Anand's Google Nexus One Review, Apr. 2010, 5 pages.
SensatioN ROM 4.1, xda developers, Mar. 2012, 5 pages.
Transparent Launcher, Jan. 2011, 3 pages.
The State Intellectual Property Office of the People's Republic of China Application Serial No. 201310145906.8, Office Action dated Sep. 14, 2015, 9 pages.
European Patent Office Application No. 12002998.8, Search Report dated Jan. 25, 2016, 6 pages.

* cited by examiner (b)

MOBILE TERMINAL AND CONTROL METHOD THEREOF

CROSS-REFERENCE TO RELATED APPLICATIONS

This application is a continuation of U.S. Application No. 13/546,955, filed on Jul. 11, 2012, now U.S. Patent No. 8,904,291, which claims the benefit of earlier filing date and right of priority to EP Patent Application No. 12002998.8, filed on 27 Apr. 2012, the contents of which are all incorporated by reference herein in their entirety.

TECHNICAL FIELD

The present invention relates to a mobile terminal, and more particularly, to a mobile terminal capable of transmitting data corresponding to a touch applied to an input area to a client terminal to achieve easy data exchange and a control method thereof.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

A terminal can exchange data with another terminal, and an attempt to effectively and conveniently exchange data between terminals is made.

SUMMARY

The present invention provides a mobile terminal capable of transmitting data corresponding to a touch applied to an input area to a client terminal to achieve easy data exchange and a control method thereof.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
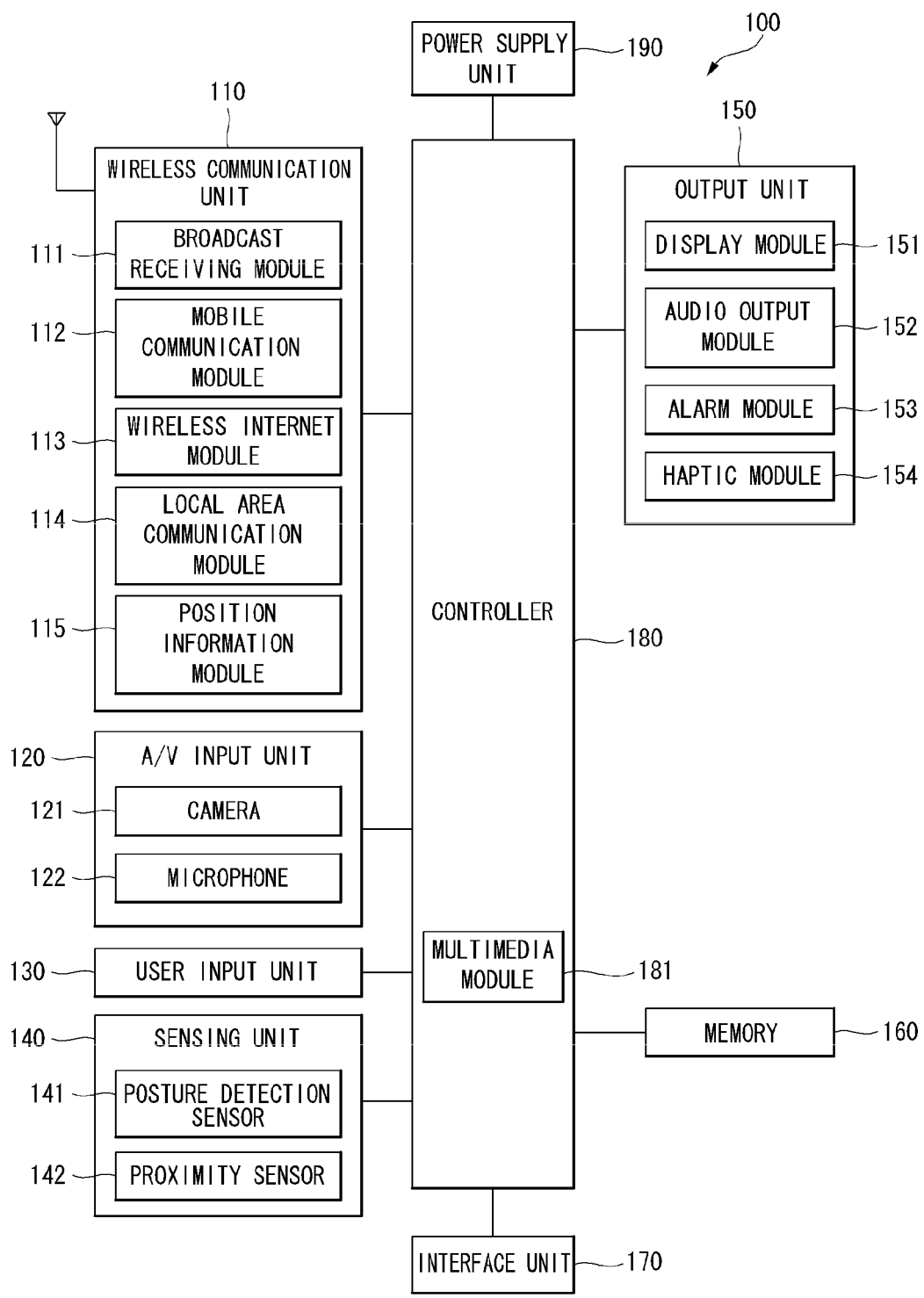
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
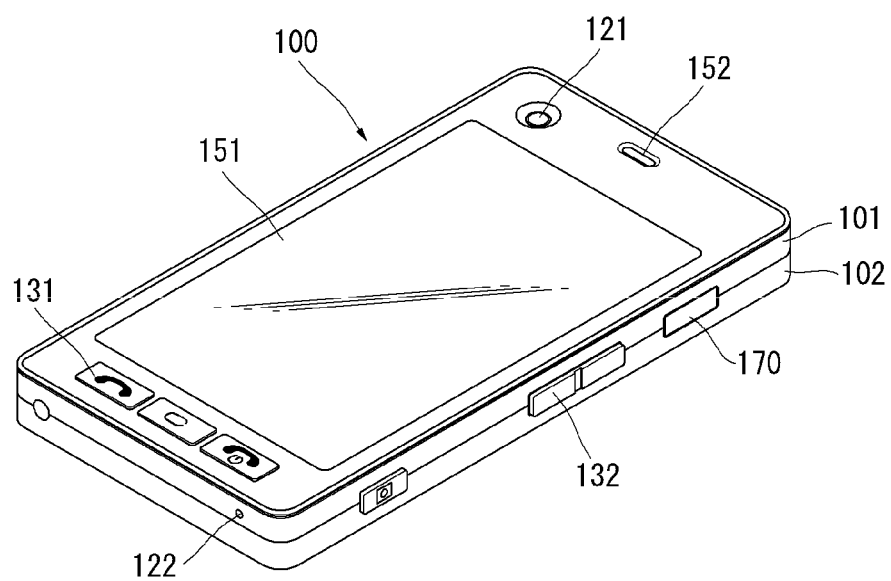
FIG. 2A is a front perspective view of the mobile terminal according to an embodiment.

FIG. 2A is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 2B:
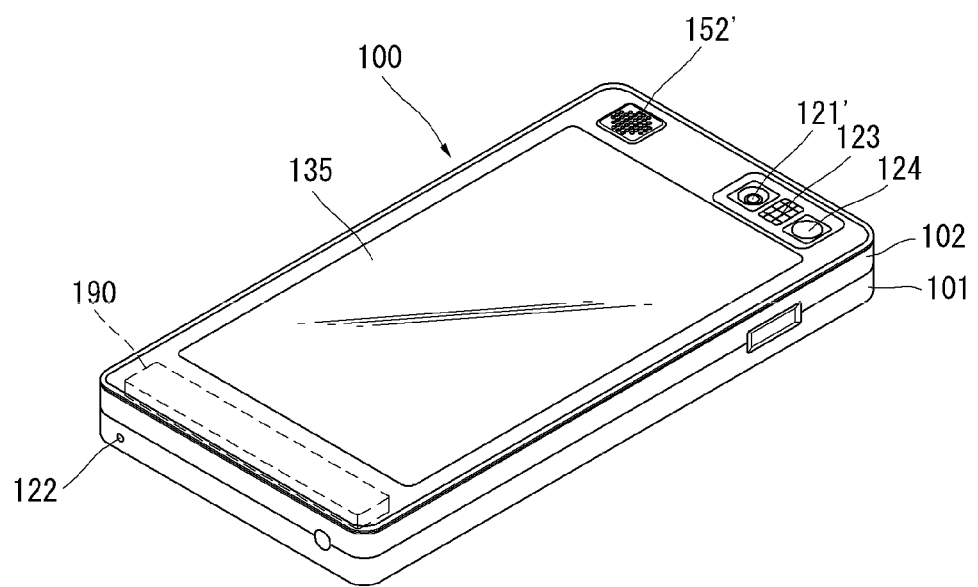
FIG. 2B is a rear perspective view of the mobile terminal according to an embodiment.

FIG. 2B is a rear perspective view of the mobile terminal (shown in FIG. 2A) according to an embodiment.

Referring to FIG. 2A, a camera 121' may be additionally attached to the rear side of the terminal body (i.e., the rear case 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 2C:
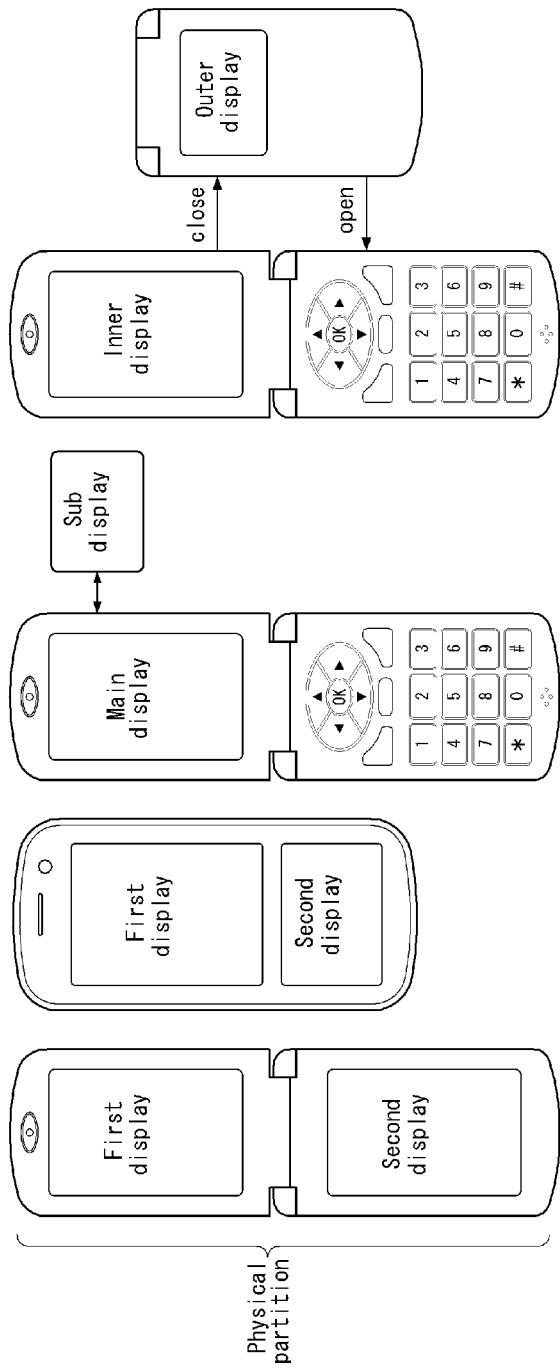
FIGS. 2C and 2D illustrate forms of the mobile terminal and display screens according to various embodiments.
Figure 2D:
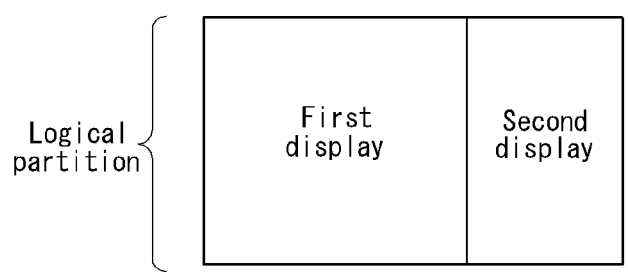

FIGS. 2C and 2D illustrate the mobile terminal 100 and the display 151 according to various embodiments.

Referring to FIG. 2C, the display 151 may include a first display and a second display that are physically separated from each other. In a folder type or slide type mobile terminal having two bodies connected through a hinge or a slide, the first display (or main display) may be formed on the inner face or outer face of one of the bodies, and the second display (or sub display) may be formed on the inner face or outer face of the other body. The sub display may be separated from the mobile terminal and may be detachably combined with the mobile terminal body through an interface to display data from the mobile terminal 100.

The display 151 may include first and second displays that may be logically separated from each other in a display panel, as shown in FIG. 2D.

Figure 3:
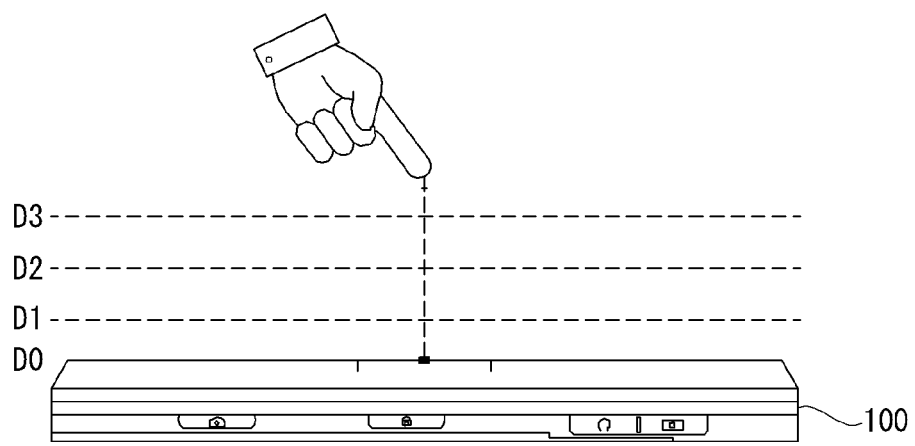
FIG. 3 is a view for explaining a proximity depth of a proximity sensor.

FIG. 3 is a view for explaining a proximity depth of a proximity sensor.

As shown in FIG. 3, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 3 shows a section of the touch screen in which proximity sensors capable of sensing three proximity depths may be provided. Proximity sensors capable of sensing less than three or more than four proximity depths may be provided in the touch screen.

More specifically, when the pointer completely contacts the touch screen (D0), it may be recognized as contact touch. When the pointer is located within a distance D1 from the touch screen, it may be recognized as a proximity touch of a first proximity depth. When the pointer is located in a range between the distance D1 and a distance D2 from the touch screen, it may be recognized as a proximity touch of a second proximity depth. When the pointer is located in a range between the distance D2 and a distance D3 from the touch screen, it may be recognized as a proximity touch of a third proximity depth. When the pointer is located greater than the distance D3 from the touch screen, it may be recognized as cancellation of the proximity touch.

Accordingly, the controller 180 may recognize the proximity touch as various input signals according to proximity distance and proximity position of the pointer with respect to the touch screen, and the controller 810 may perform various operation controls according to the input signals.

Figure 4A:
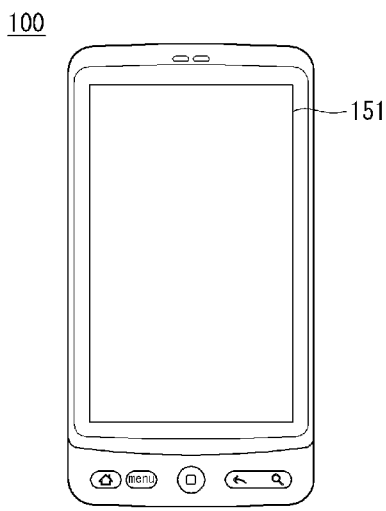
FIG. 4A and FIG. 4B illustrate exemplary mobile terminals according to an embodiment.
Figure 4B:
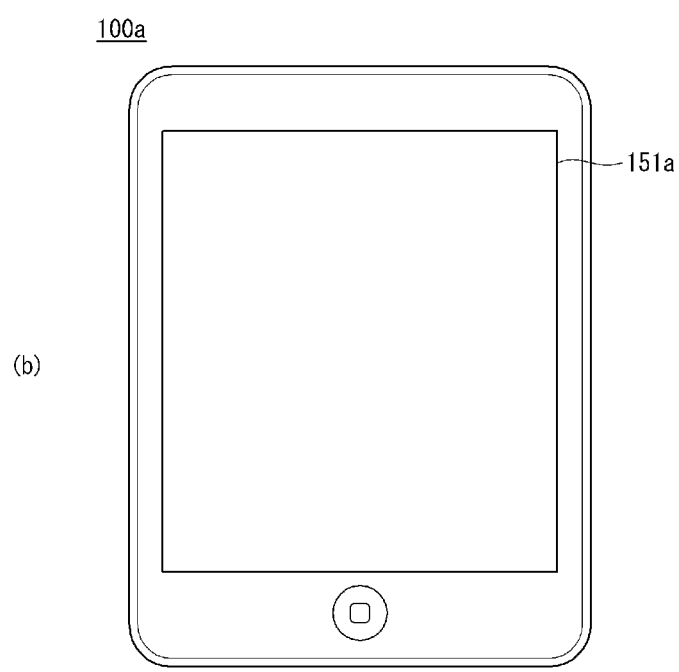

FIG. 4A and FIG. 4B illustrates exemplary mobile terminals according to an embodiment of the invention.

As shown in FIG. 4A and FIG. 4B, the present invention can be applied to mobile terminals 100 and 100a in various forms.

Referring to FIG. 4(a), the mobile terminal 100 may include the display 151 in a general form. For example, the present invention can be applied to the mobile terminal 100 that is as large as a user can touch the display 151 with one hand gripping the mobile terminal 100.

Referring to FIG. 4(b), the mobile terminal 100a may include a display 151a larger than the general display. For example, the present invention can be applied to the mobile terminal 100a that is as large as a user cannot touch the display 151a with the hand gripping the mobile terminal 100a.

Figure 5:
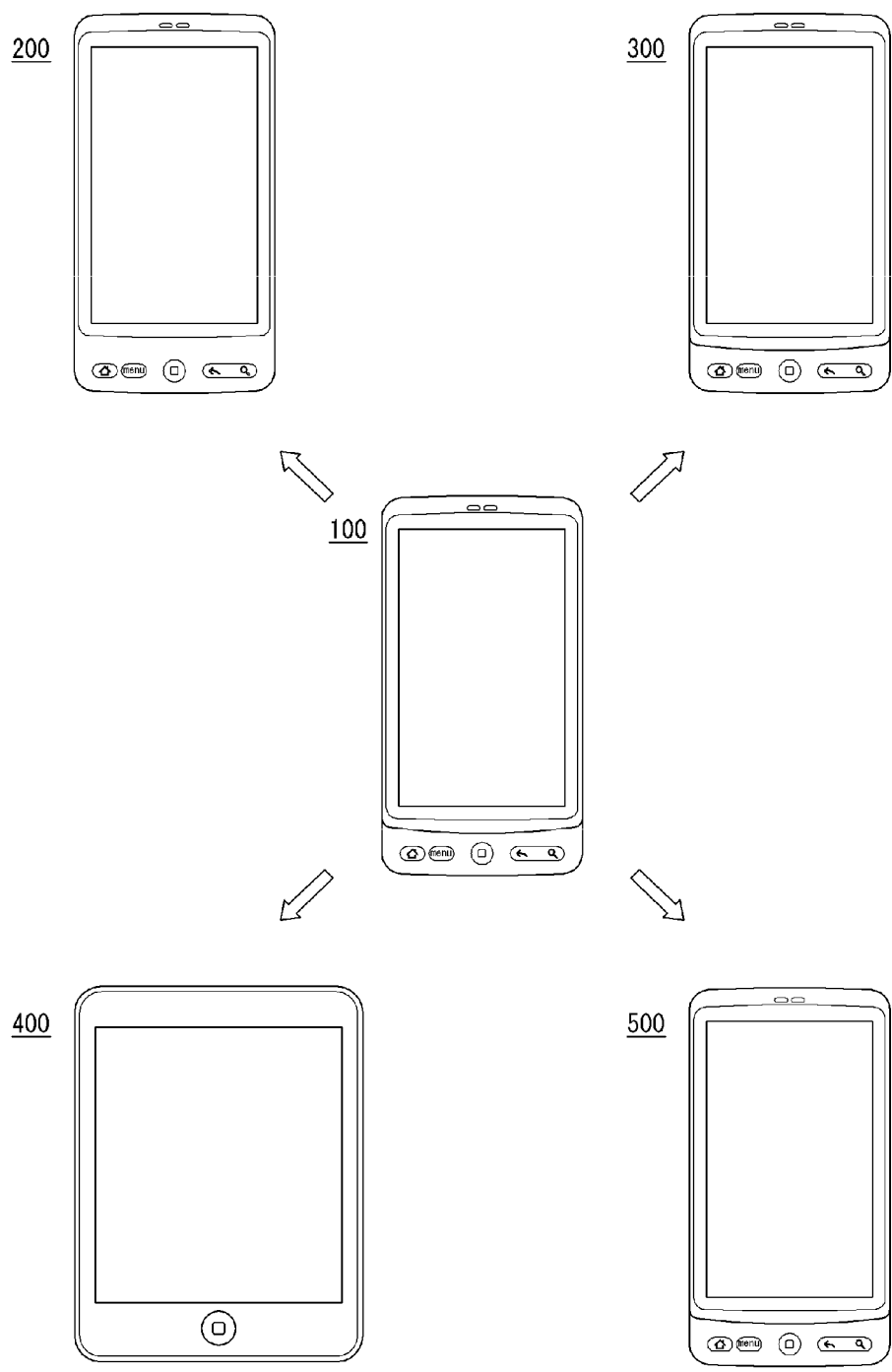
FIGS. 5, 6 and 7 illustrate data exchange between mobile terminals according to an embodiment.
Figure 6:
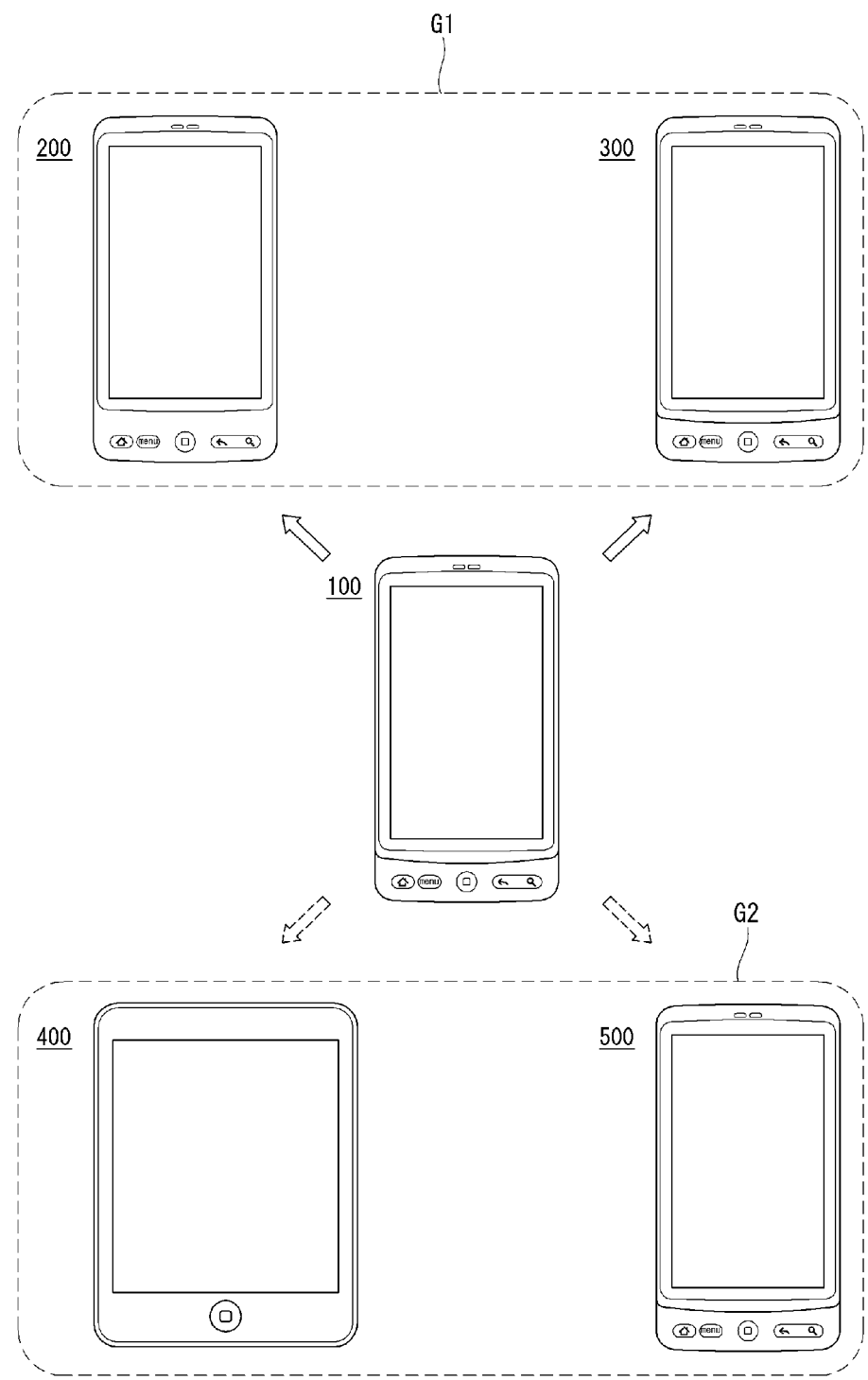
Figure 7:
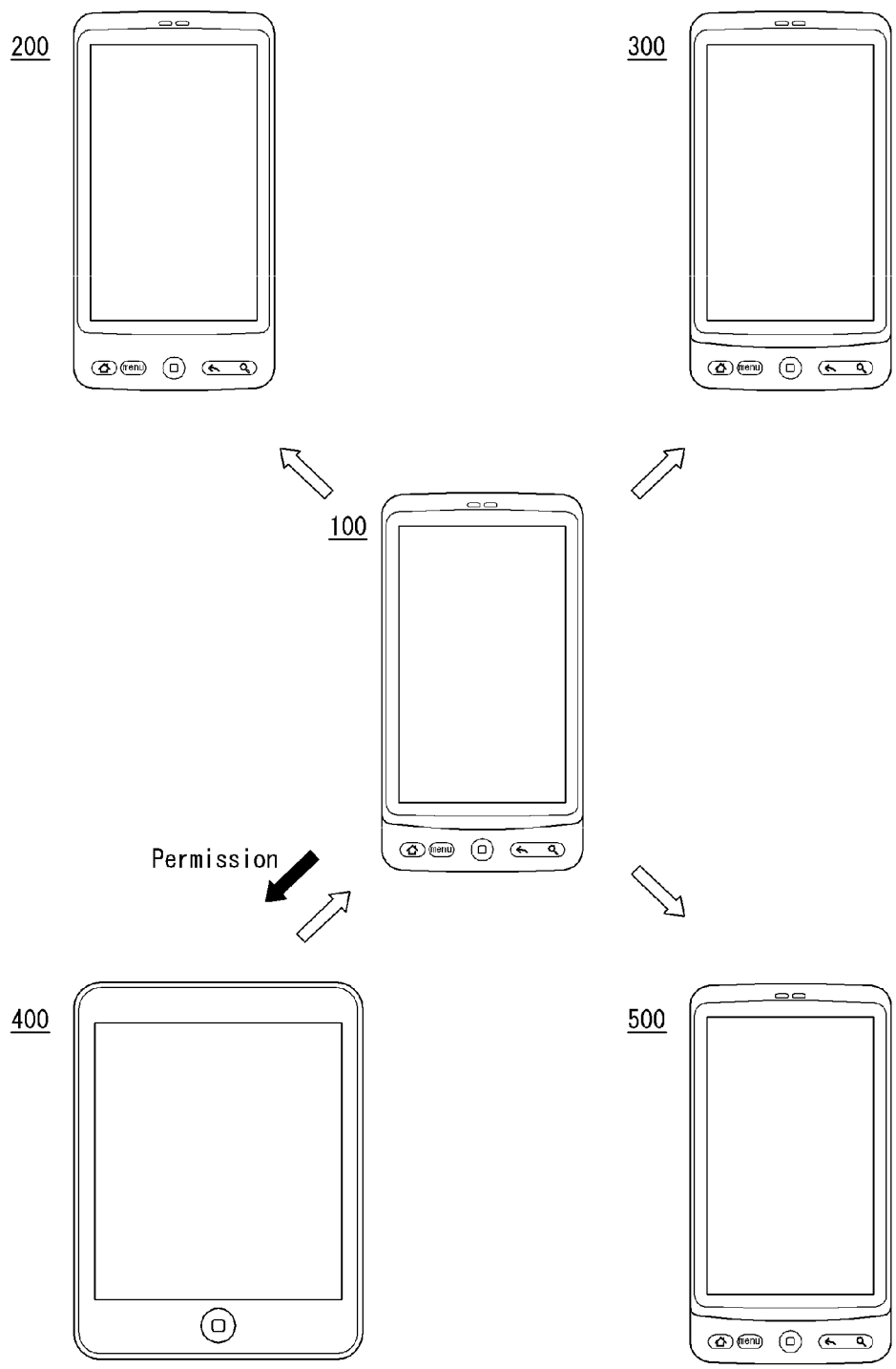

FIGS. 5, 6 and 7 illustrate data exchange between mobile terminals according to an embodiment of the invention.

As shown in FIGS. 5, 6 and 7, the mobile terminal 100 according to an embodiment of the invention can transmit information to client terminals including other mobile terminals.

Referring to FIG. 5, the mobile terminal 100 can transmit information to first to fourth terminals 200, 300, 400 and 500. That is, the mobile terminal 100 can function as a server and the first to fourth terminals 200, 300, 400 and 500 can function as clients.

The controller 180 of the mobile terminal 100 can transmit content corresponding to a touch action of a user, which is acquired through an application displayed in response to the touch action of the user, to the first to fourth terminals 200, 300, 400 and 500 through the wireless communication unit 110. Transmission of the content from the mobile terminal 100 functioning as a server to the first to fourth terminals 200, 300, 400 and 500 may be performed in real time. For example, contents input to the mobile terminal 100 by the user can be transmitted to the first to fourth terminals 200, 300, 400 and 500 at the same time the contents are input.

Referring to FIG. 6, the mobile terminal 100 can respectively transmit content to a first group G1 including the first and second terminals 200 and 300 and a second group G2 including the third and fourth terminals 400 and 500. The first group G1 and the second group G2 can be determined by the user. The user can set data such that data transmitted to the first group G1 is different from data transmitted to the second group G2.

Referring to FIG. 7, the mobile terminal 100 can transmit content acquired from a specific terminal to other terminals. For example, the mobile terminal 100 can give specific permission to the third terminal 400. For example, the mobile terminal 100 can give the third terminal 400 permission to transmit content to the mobile terminal 100. Then, the third terminal 300 can transmit content to the mobile terminal 100. Upon reception of the content from the third terminal 300, the mobile terminal 100 can retransmit the content to the first, second and fourth terminals 200, 300 and 500. That is, the mobile terminal 200 can retransmit received data as a server.

Figure 8:
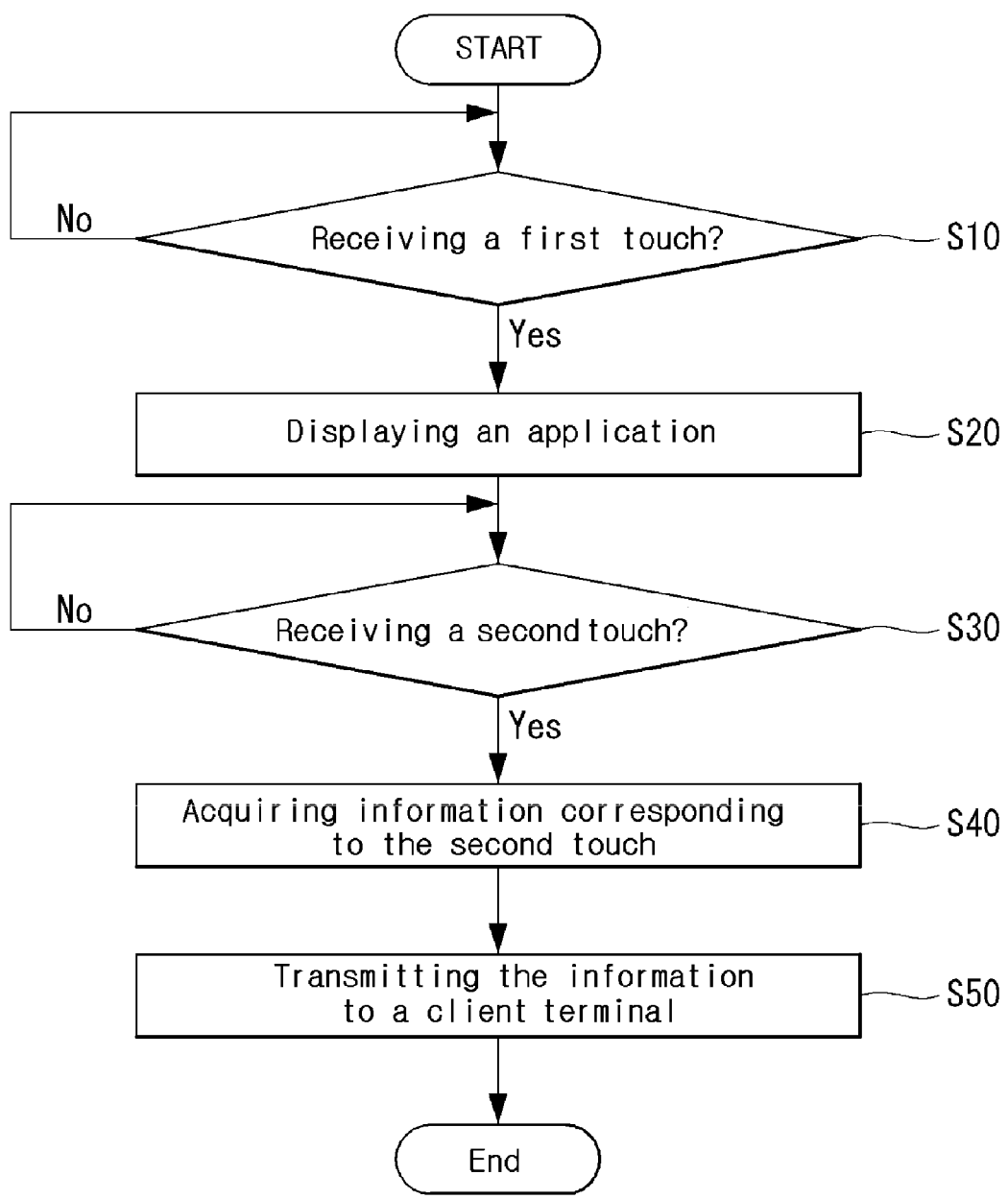
FIG. 8 is a flowchart illustrating an operation of a mobile terminal according to an embodiment.

FIG. 8 is a flowchart illustrating an operation of the mobile terminal according to an embodiment of the present invention.

Referring to FIG. 8, the controller 180 of the mobile terminal 100 according to an embodiment of the present invention can receive a first touch from the user (S10).

The first touch may be a predetermined touch action applied to the display 151. For example, the first touch can be drag starting from the upper end of the display 151 toward the bottom end of the display 151.

Upon reception of the first touch, the controller 180 may display an application (S20). The application may be initiated by the first touch. Otherwise, the application which has been initiated may be displayed by the first touch. For example, an application being executed in the background can be executed in the foreground by the first touch.

The application may have a function of displaying a specific area to which a touch input of the user can be applied. For example, when the first touch is applied, the application can produce effects as if a curtain drops from the top end of the display 151 to display the specific area.

The user can apply a second touch to the mobile terminal (S30).

The second touch may be a user touch input applied to the displayed application. For example, a touch input can be applied to the application area displayed according to the effects as if a curtain drops from the top end of the display 151. The touch input may be information input by the user, such as a specific character, image, etc.

Information corresponding to the second touch may be acquired (S40).

The information corresponding to the second touch may mean content input according to a user touch. The content may be an image generated by the touch, a character or numeral extracted from the touch, etc. For example, when handwriting is made by a touch input, a character and/or a numeral corresponding to the handwriting can be acquired.

The acquired information may be transmitted to a client terminal (S50).

The content corresponding to the acquired information may be transmitted to a client terminal including at least one terminal connected to the mobile terminal 100. That is, the information corresponding to the second touch can be transmitted to other terminals without additional operation. Transmission of information to other terminals can be performed in real time. That is, information corresponding to a touch input can be transmitted to other terminals for a time from touch down on a specific point of the display 151 to touch up.

Figure 9A:
FIG. 9A and FIG. 9B show a display state of the mobile terminal illustrated in FIG. 8 before applications are displayed.
Figure 9B:
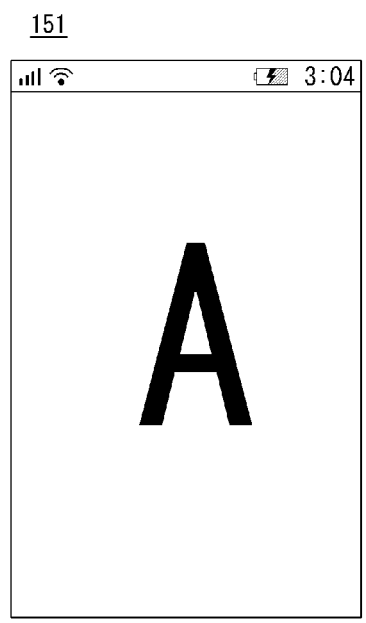

FIGS. 9A and 9B show a display state of the mobile terminal illustrated in FIG. 8 before the application is displayed.

Referring to FIGS. 9A and 9B, the mobile terminal 100 according to an embodiment of the present invention may be in a general environment before the application is displayed by the first touch.

As shown in FIG. 9(a), the display 151 of the mobile terminal 100 may display a background corresponding to an idle screen before the application is displayed. For example, the display 151 can display icons by which the user will select a specific application.

Referring to FIG. 9(b), the mobile terminal 100 may be in a state that a specific application is being executed. That is, the display 151 can display an image representing that the specific application is being executed.

FIGS. 10 to 13 illustrate the operation of the mobile terminal, shown in FIG. 8.

As shown in FIGS. 10A to 13, the controller 180 of the mobile terminal 100 according to an embodiment of the present invention can display an application according to an embodiment in response to the first touch of the user. The application according to an embodiment may be executed and waits in the background or may be initiated by the first touch of the user.

Figure 10A:
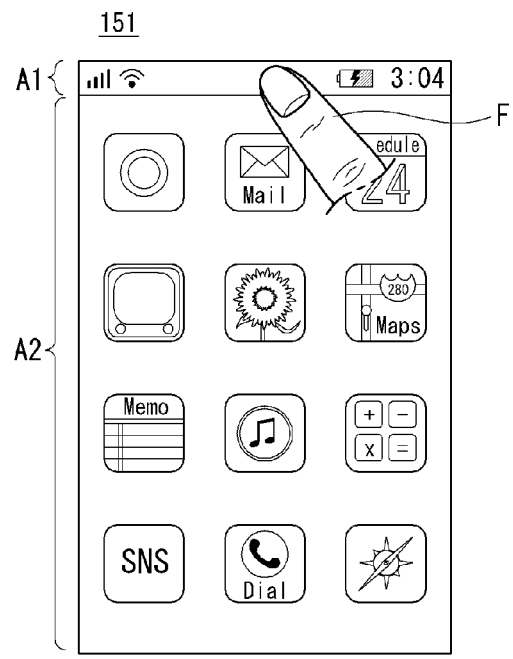
FIGS. 10A, 10B, 11A, 11B, 12, and 13 illustrate an operation of the mobile terminal shown in FIG. 8.

Referring to FIG. 10(a), the user can touch a first area A1 with a finger F. The first area A1 may correspond to a status bar that displays a communication state, a battery state and the like of the mobile terminal 100. While the following description is made on the assumption that the first area A1 is located at the upper end of the display 151, the first area A1 can be arranged at the bottom end or a side of the display 151.

Figure 10B:
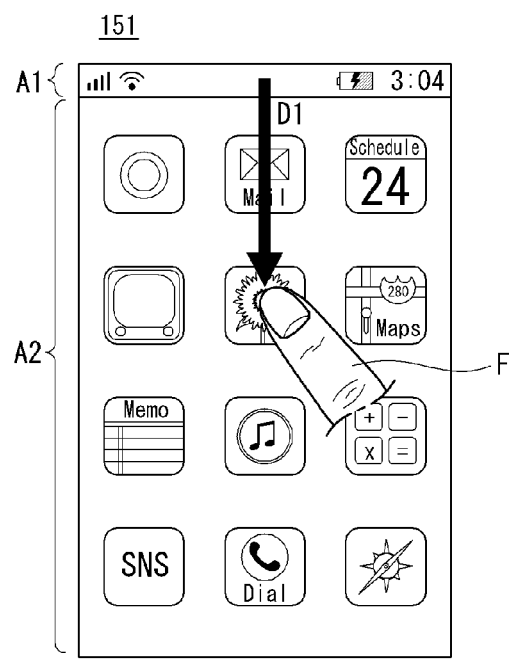

Referring to FIG. 10(b), after touching the first area A1, the user can drag the touch in a first direction D1 . That is, the user can drag the touch by a predetermined distance or longer in the first direction D1, for example, from the first area A1 toward a second area A2.

Figure 11A:
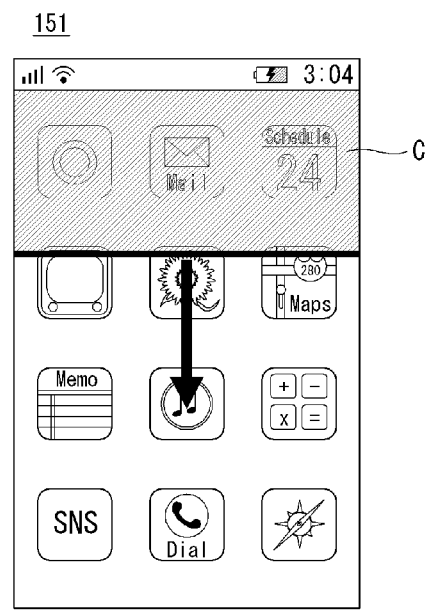

Referring to FIG. 11(a), upon input of the first touch in the first direction D1, the controller 180 of the mobile terminal 100 can display an application. For example, an input area C in the form of a curtain that drops from the first area A1 and gradually covers the first area A1 and the second area A2.

Figure 11B:
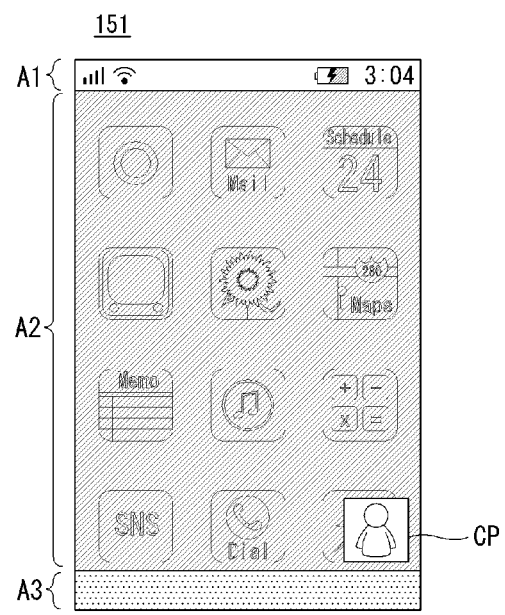

Referring to FIG. 11(b), the input area C may be overlaid on a previously displayed screen in a translucent manner.

The input area C may be overlaid on at least part of the previously displayed screen. That is, the input area C can be display in the form of a curtain that drops from the top to the bottom of the display 151 and overlaid on the previously displayed screen. Accordingly, the limited display area of the display 151 can be used more effectively.

The input area C may be displayed in a translucent manner. That is, the previously displayed screen can be viewed through the input area C. Accordingly, it is possible to solve problems of inconvenience that display of the input area C and cancellation of display are repeated in order to view previously displayed images. Furthermore, information of a previously displayed image, which is seen translucently, can be used while the input area C is used.

The translucent property of the input area C can be adjusted by a control signal of the controller 180 and/or user selection. For example, the transparency of the input area C can be increased or decreased such that the previously displayed screen is viewed distinctly or is not viewed.

The input area C may be opaque. For example, the transparency of the input area C can be adjusted by a control signal of the controller 180 and/or user selection such that the input area C becomes opaque.

The input area C may include the second area A2 and a third area A3. The second area A2 may be an area to which the user inputs information through a touch action. The third area A3 may be an area to which a touch action for canceling display of the input area C can be applied. The second area A2 can display a client icon CP by which information about a client terminal is displayed. When the user touches the client icon CP, a specific operation such as an operation of displaying information about a terminal connected to the mobile terminal 100 can be performed, which will be described below.

Figure 12:
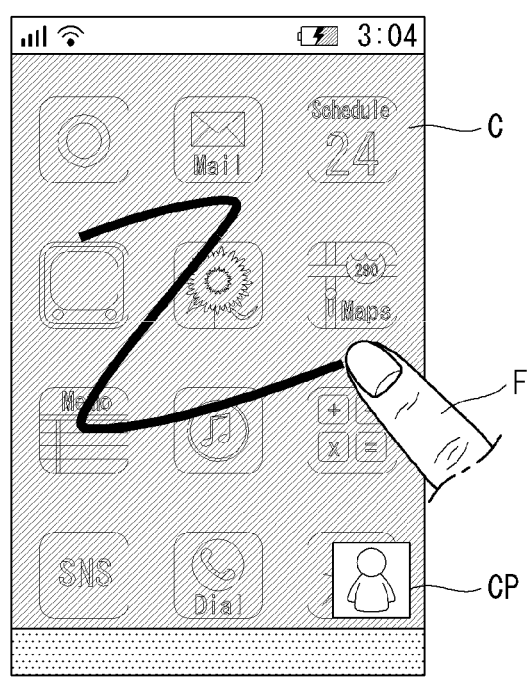

Referring to FIG. 12, the user can touch the displayed input area C using a finger F. That is, the user can apply the second touch discriminated from the first touch to the input area C so as to input specific information. Upon input of the specific information, the controller 180 can recognize the specific information as an image or extract a numeral and/or a character from the information.

Figure 13:
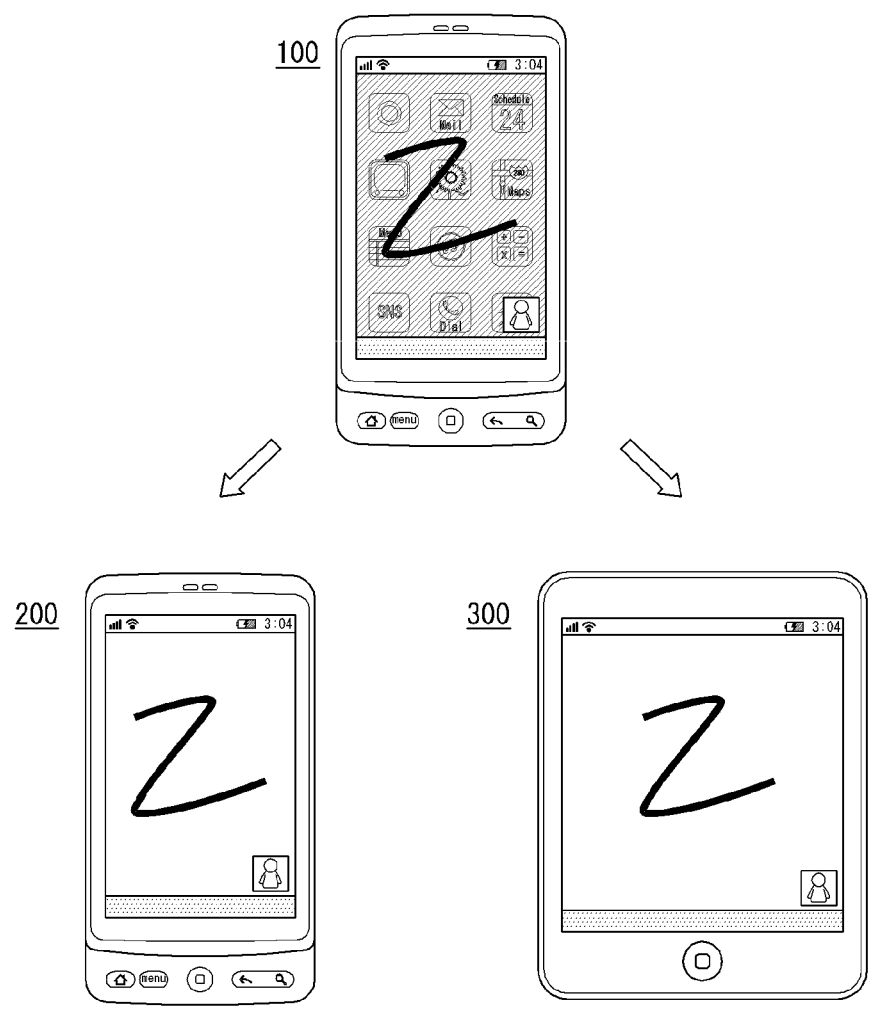

Referring to FIG. 13, content that is information corresponding to the touch applied to the input area C can be transmitted to client terminals connected to the mobile terminal 100 in real time. That is, when the user performs a touch action on the mobile terminal 100, an image corresponding to the touch action can be shared with the client terminals. For example, the mobile terminal 100 functions as a server and the first and second terminals 200 and 300 serve as clients. Information input to the mobile terminal 100 as a server can be transmitted to the first and second terminals 200 and 300 as clients. According to an embodiment of the present invention, it is possible to share information with a plurality of client terminals in real time without executing an additional application and waiting normal operation of the application.

Figure 14A:
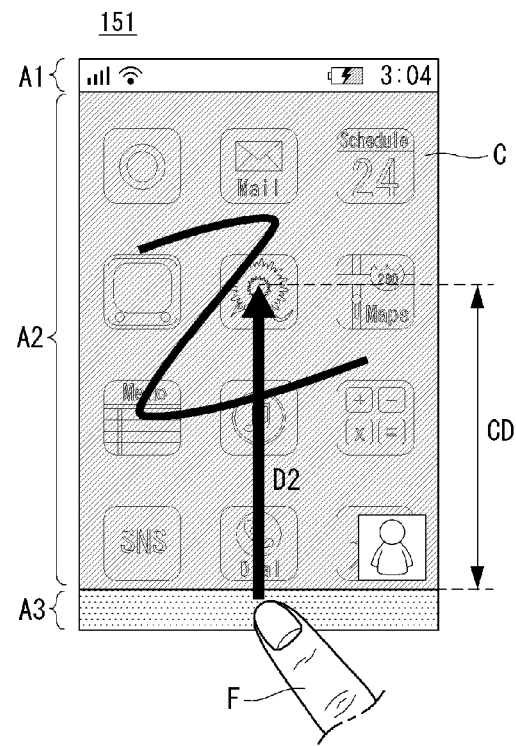
FIG. 14A and FIG. 14B illustrate a procedure of canceling display of an application in the mobile terminal shown in FIGS. 9A and 9B.
Figure 14B:

FIG. 14A and FIG. 14B illustrate a procedure of canceling display of the application in the mobile terminal shown in FIG. 9A and FIG. 9B.

Referring to FIG. 14A and FIG. 14B, the controller 180 of the mobile terminal 100 according to an embodiment of the invention can cancel display of the input area C when a specific touch is applied.

Referring to FIG. 14(a), the user can touch the third area A3 with a finger F and drag the touch in a second direction D2. The user can drag the touch by a critical distance CD or more in the second direction D2. The critical distance CD may be a predetermined distance. The controller 180 can cancel display of the input area C when the user performs touch-and-drag by the critical distance or longer. If the touch-and-drag distance is shorter than the critical distance CD, the controller 180 can maintain display of the input area C or perform another operation which will be described below.

Referring to FIG. 14(b), when the user drags the touch in the direction D2 by the critical distance CD or more, the controller 180 can display the screen before the input area C is displayed on the display 151. Since the input area C can be displayed or display of the input area C can be cancelled through an operation of touching the first area A1 and dragging the touch downward or an operation of touching the third area A3 and dragging the touch upward, it is possible to easily share information with other terminals and/or easily cancel sharing of information.

Figure 15A:
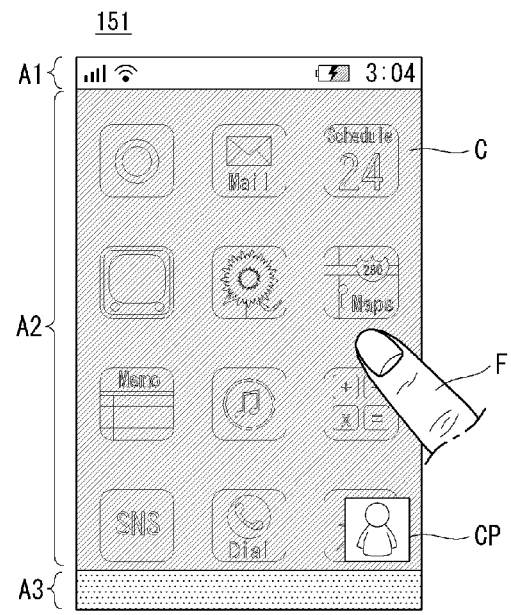
FIG. 15A and FIG. 15B illustrate a procedure of controlling configuration of the mobile terminal shown in FIGS. 9A and 9B.
Figure 15B:
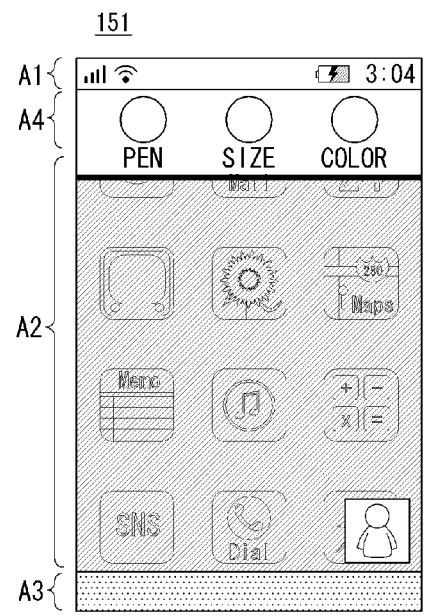

FIG. 15A and FIG. 15B illustrate a procedure of controlling configuration of the mobile terminal shown in FIG. 9A and FIG. 9B.

Referring to FIG. 15A and FIG. 15B, the controller 180 of the mobile terminal 100 according to an embodiment of the present invention can provide a screen on which the user can control configuration of the input area C when the user applies a specific touch to the mobile terminal 100.

Referring to FIG. 15(a), the user can touch a point in the input area C for a predetermined time or longer. That is, the user can continuously touch a specific point without a drag or flicking operation.

Referring to FIG. 15(b), when the touch is applied to the specific point, the controller 180 can display a menu through which the user can control configuration of the input area C in a fourth area A4. A form, size, color, etc. of a touch trace can be selected according to the configuration. For example, a form of a touch trace corresponding to a touch applied by the user can be selected from a ballpoint pen writing form, fountain pen writing form, etc. according to the configuration.

Figure 16A:
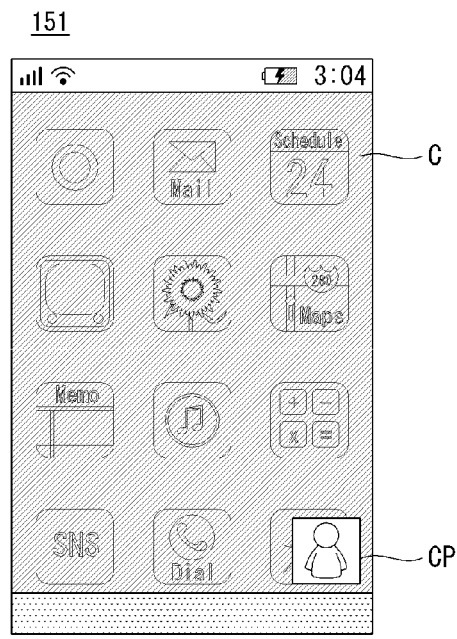
FIG. 16A and FIG. 16B show a screen that displays other terminals with which the mobile terminal shown in FIGS. 9A and 9B exchanges data.
Figure 16B:
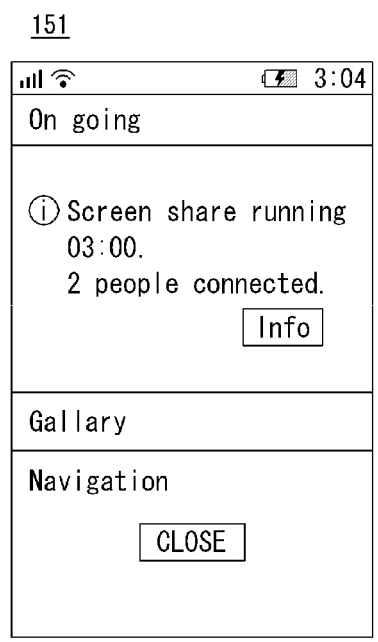

FIGS. 16A and 16B illustrate a display of another terminal with which the mobile terminal of FIGS. 9A and 9B exchanges data.

Referring to FIG. 16A and FIG. 16B, the controller 180 of the mobile terminal 100 according to an embodiment of the present invention can display information about another terminal connected to the mobile terminal 100.

Referring to FIG. 16(a), the client icon CP can be displayed in the input area C. The user can select the client icon CP.

Referring to FIG. 16(b), upon selection of the client icon CP by the user, the controller 180 can display information about a client terminal connected to the mobile terminal 100. For example, the controller 180 can display information such as the number of terminals connected to the mobile terminal 100, a time when connection is made, states of other terminals, etc.

FIGS. 17A, 17B, 18, 19A and 19B illustrate a procedure of deleting some of information input to the mobile terminal shown in FIG. 9A and FIG. 9B.

As shown in FIGS. 17A, 17B, 18, 19A and 19B, the mobile terminal 100 according to an embodiment of the present invention can delete part of an input touch trace through a touch operation of moving the input area C.

Figure 17A:
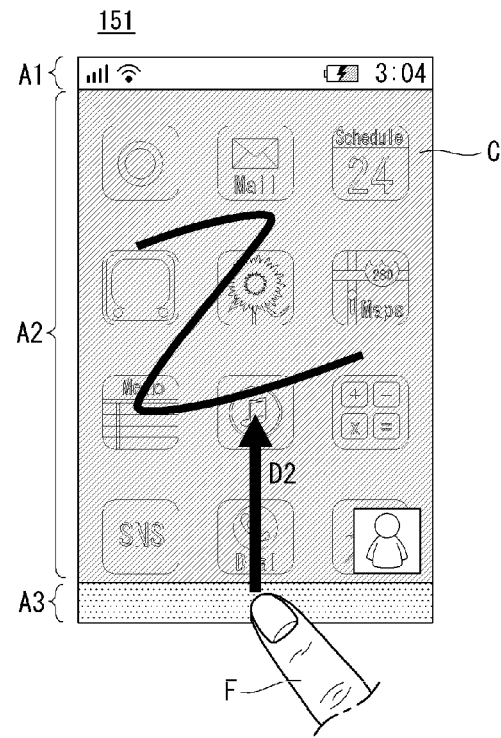
FIGS. 17A, 17B, 18, 19A and 19B illustrate a procedure of deleting some of input information in the mobile terminal of FIGS. 9A and 9B.

Referring to FIG. 17(a), the user can touch the third area C3 with a finger F and drag the touch upward. The trace of the touch dragged upward may be shorter than the critical distance CD shown in FIGS. 14A and 14B. Otherwise, the user can drag the touch applied to the third area A3 with the finger F upward and then drag the touch downward.

Figure 17B:
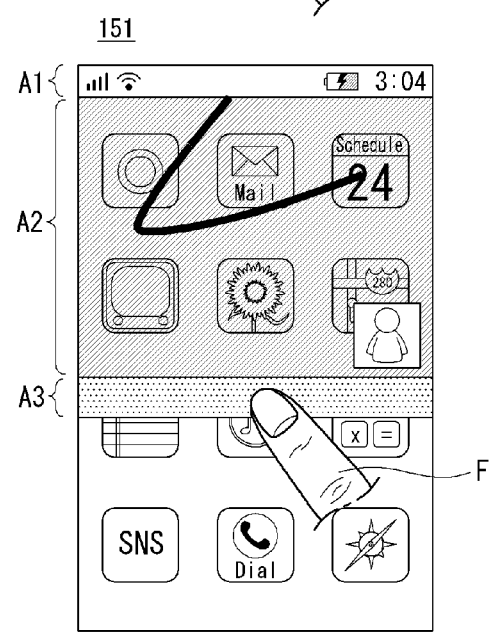

Referring to FIG. 17(b), when the user drags the touch upward, the controller 180 can move the input area C upward.

Figure 18:
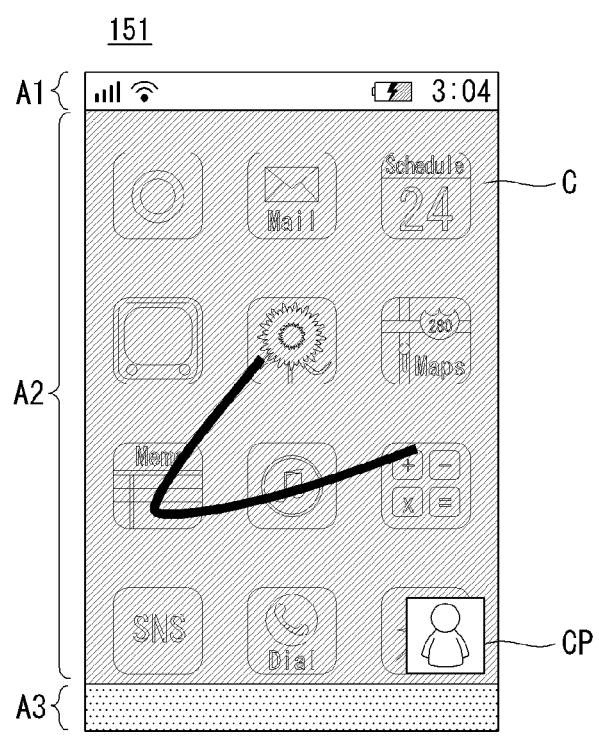

Referring to FIG. 18, upon completion of the drag using the finger F of the user, the controller 180 can return display of the input area C to the original state. Here, the controller 180 can delete a touch trace that was moved out of the display area of the display 151. That is, a function of deleting part of a previously input touch trace can be executed.

Figure 19A:
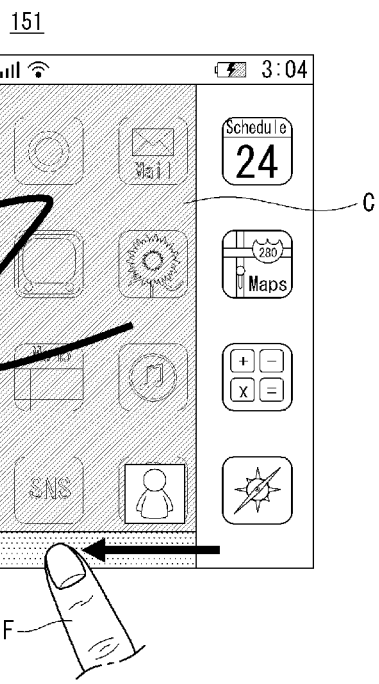
Figure 19B:
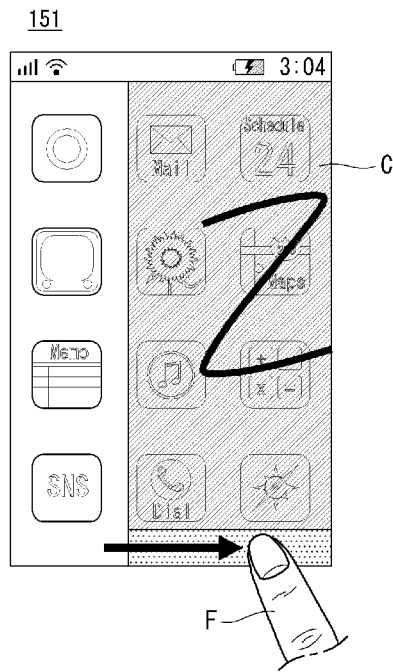

Referring to FIGS. 19(a) and 19(b), the user can drag the touch applied to the input area C to the left and/or to the right. That is, the user can perform a touch operation to move at least part of the touch trace displayed in the input area C out of the display area of the display 151. Then, the controller 180 can delete the part of the touch trace, which was moved out of the display area of the display 151, from the displayed touch trace. According to an embodiment of the present invention, it is possible to easily delete some or whole of the trace of the previously input touch.

FIGS. 20A to 23 illustrate a procedure of selecting a terminal with which the mobile terminal of FIGS. 9A and 9B will exchange data.

As shown in FIGS. 20 to 23, the controller 180 of the mobile terminal 100 according to an embodiment of the present invention can easily select a terminal with which the mobile terminal 100 will exchange data.

Figure 20A:
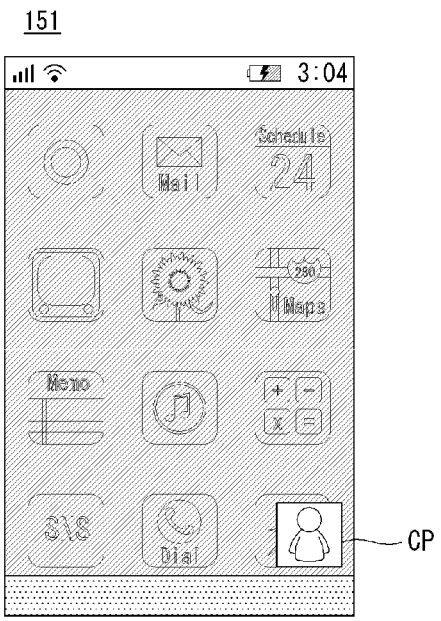
FIGS. 20A, 20B, 21, 22A, 22B, 22C and 23 illustrate a procedure of selecting other terminals with which the mobile terminal of FIGS. 9A and 9B will exchange data.
Figure 20B:
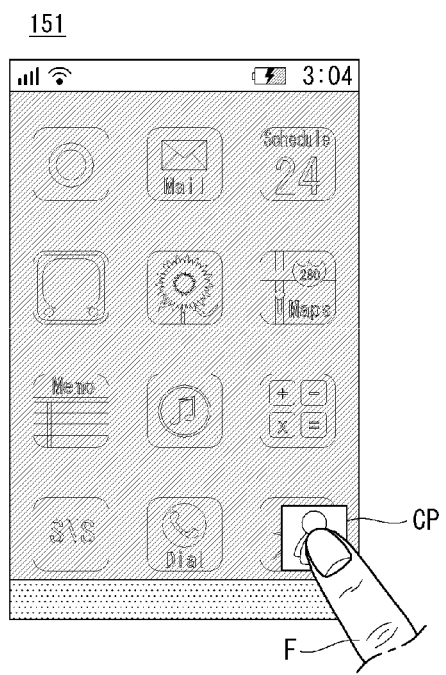

Referring to FIGS. 20(a) and 20(b), the display 151 may display the client icon CP. The user can select the client icon CP.

Figure 21:
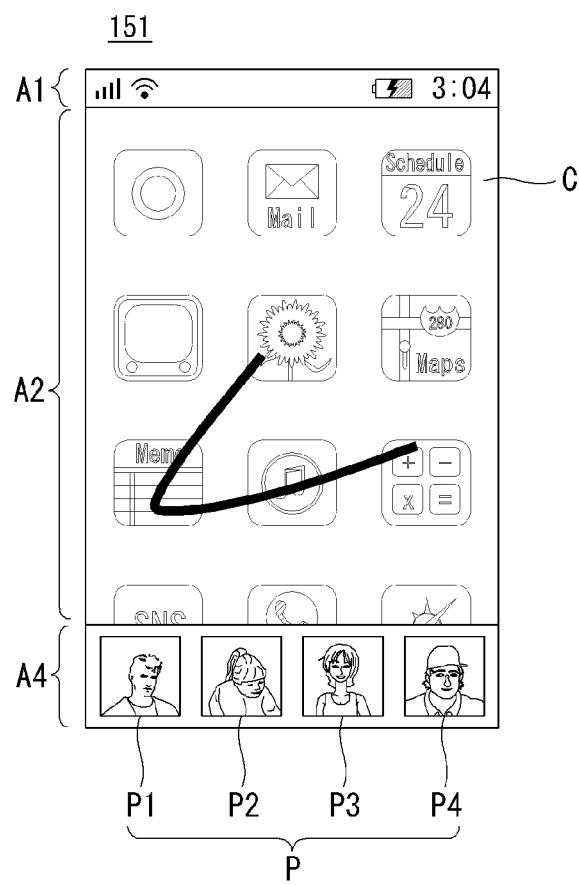

Referring to FIG. 21, upon selection of the client icon CP, the controller 180 can display client information P in a fourth area A4. The client information P may be information about a terminal that is connected to the mobile terminal 100 or can be connected to the mobile terminal 100. For example, the controller 180 can display first to fourth client information P1, P2, P3 and P4. The first to fourth client information P1, P2, P3 and P4 can be expressed as representative images set by users of respective terminals corresponding to the first to fourth client information P1, P2, P3 and P4. Otherwise, the first to fourth client information P1, P2, P3 and P4 can be expressed as representative images set by the user of the mobile terminal 100.

Referring to FIGS. 22A, 22B, 22C and 23, the user can generate a specific group by touching the displayed client information P. The user can execute a desired function only for a specific terminal.

Figure 22A:
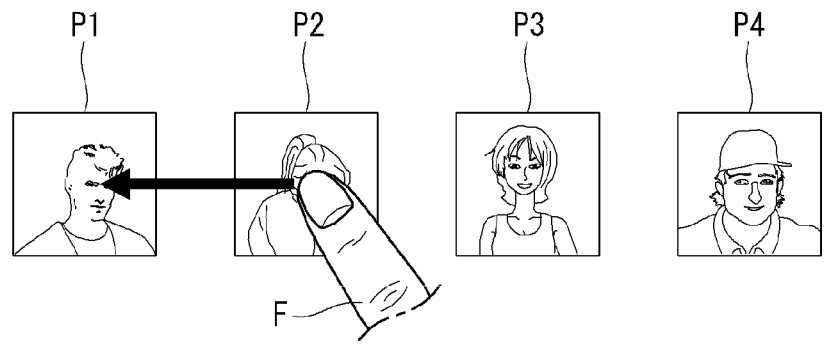
Figure 22B:
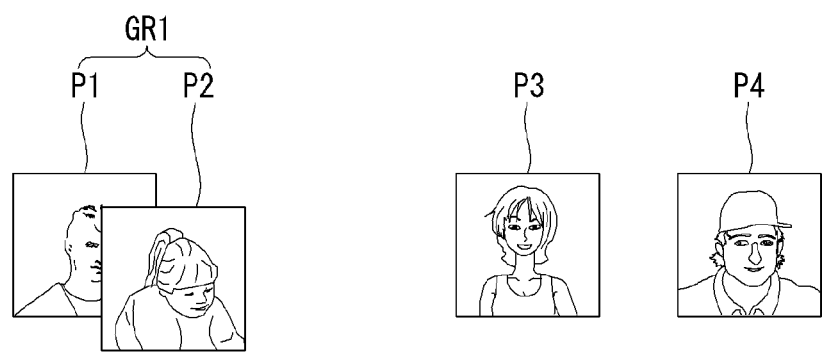

Referring to FIGS. 22(a) and 22(b), the user can touch the second client information P2 and drag the touch to the first client information P1. The dragged second client information P2 can be overlapped with the first client information P1. Since the second client information P2 is overlapped with the first client information P1, the user can intuitively recognize that the first client information P1 and the second client information P2 form a first group GR1.

Figure 22C:
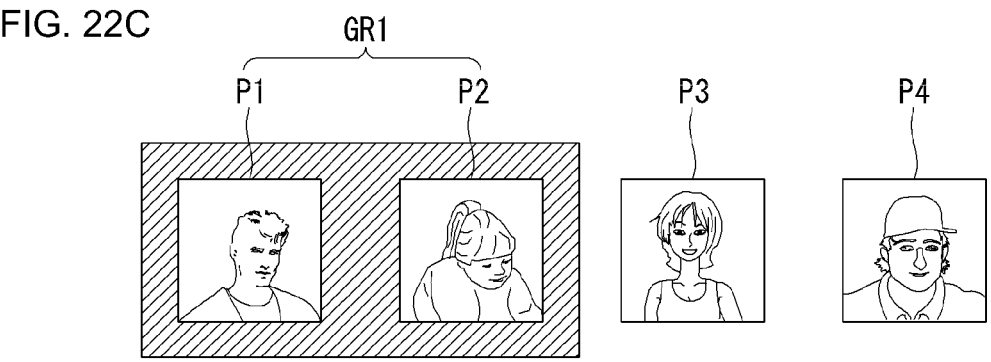

Referring to FIG. 22(c), the first client information P1 and the second client information P2 may be separated from each other by a predetermined distance. The first client information P1 and the second client information P2 can be displayed in a specific color or pattern to represent that the first client information P1 and the second client information P2 belong to the first group GR1. For example, the first client information P1 and the second client information P2 can be displayed differently from client information.

Figure 23:
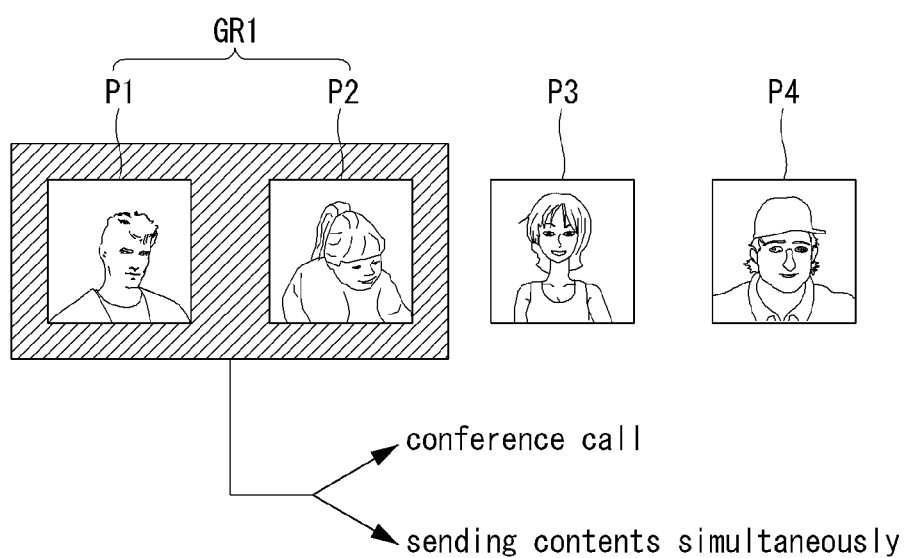

Referring to FIG. 23, the mobile terminal 100 can execute conference call with terminals corresponding to the first client information P1 and the second client information P2 belonging to the first group GR1 or simultaneously send content to the terminals. On the other hand, the mobile terminal 100 may not transmit data, transmitted to the terminals belonging to the first group GR1, to terminals corresponding to the third and fourth client information P3 and P4 and may transmit different data to the terminals corresponding to the third and fourth client information P3 and P4.

Figure 24A:
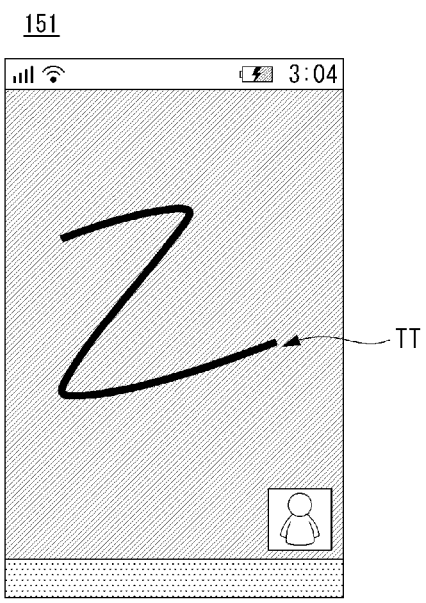
FIG. 24A and FIG. 24B illustrate a method for storing a user touch input in the mobile terminal of FIGS. 9A and 9B.
Figure 24:
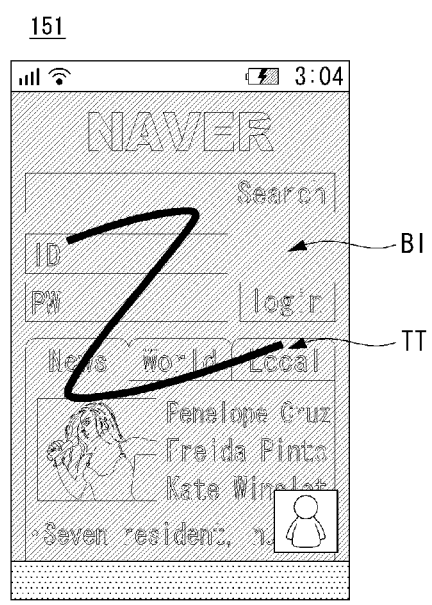

FIG. 24A and FIG. 24B illustrates a method of storing a touch input of the user in the mobile terminal of FIGS. 9A and 9B.

Referring to FIG. 24(a), the controller 180 of the mobile terminal 100 according to an embodiment of the present invention can display and/or store a touch trace TT corresponding to the touch input of the user.

Referring to FIG. 24(b), the controller 180 of the mobile terminal 100 according to an embodiment of the present invention can simultaneously display and/or store the touch tract TT corresponding to the touch input of the user and a background image BI of the display 151. That is, the touch tract TT may be displayed on the background image BI.

FIGS. 25A to 28 illustrate a procedure of transmitting data from the mobile terminal of FIG. 9A and FIG. 9B to different terminals.

Referring to FIGS. 25A to 28, the mobile terminal 100 according to an embodiment of the present invention can divide the display area of the display 151 into a plurality of areas and transmit different data to terminals respectively corresponding to the areas.

Figure 25A:
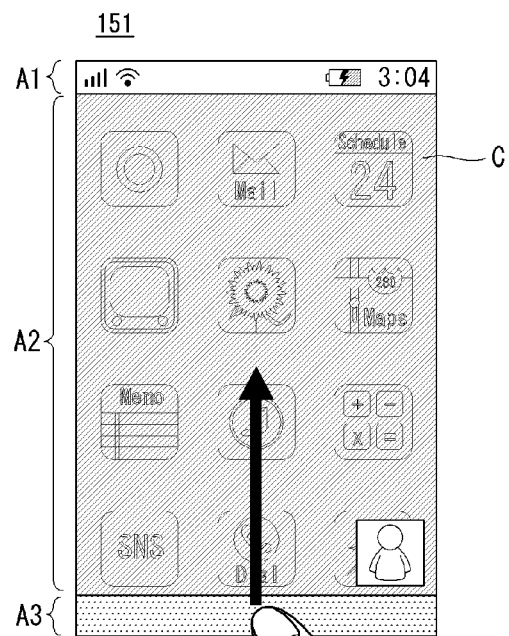
FIGS. 25A, 25B, 26, 27A, 27B and 28 illustrate a procedure of transmitting data to different terminals in the mobile terminal of FIGS. 9A and 9B.

Referring to FIG. 25(a), the user can touch the third area A3 and drag the touch.

Figure 25B:
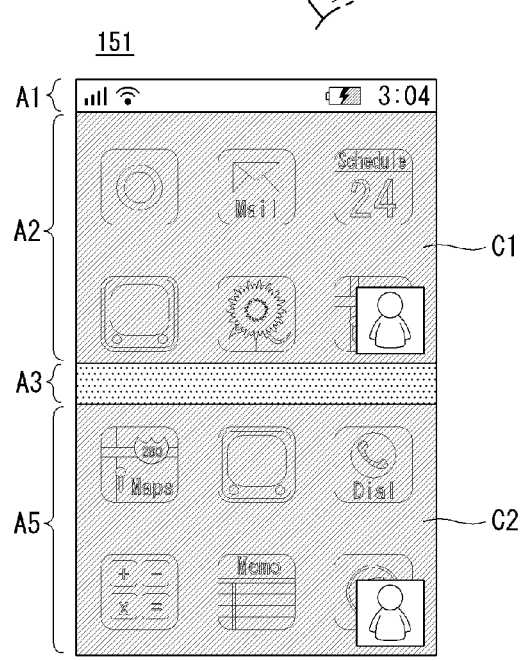

Referring to FIG. 25(b), the width of the second area A2 is reduced according to the touch action of the user and a fifth area A5 as large as the reduced area of the second area A2 can be generated. That is, the display area of the display 151 can be divided into a first input area C1 and a second input area C2.

Figure 26:
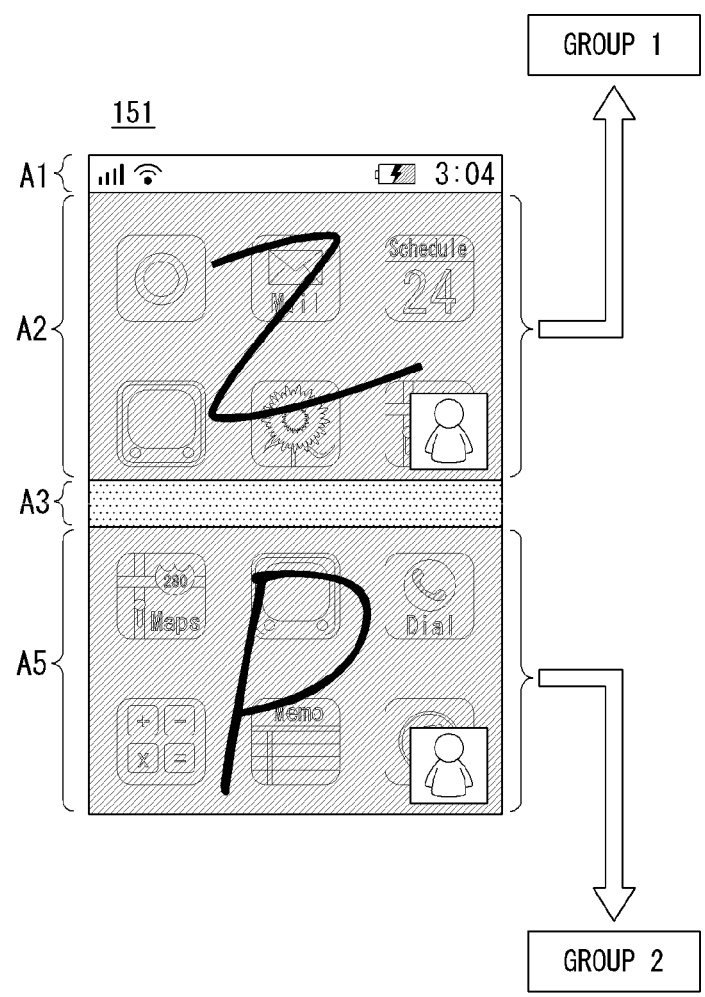

Referring to FIG. 26, the user can perform different touch operations on the second area A2 and the fifth area A5. The controller 180 can transmit data corresponding to the touch operation applied to the second area A2 to group 1 and transmit data corresponding to the touch operation applied to the fifth area A5 to group 2. That is, different terminals can respectively correspond to the areas. The second area A2 may be a public area and the fifth area A5 may be a private area. In other words, data input through the second area A2 can be shared with a plurality of terminals and data input through the fifth area A5 can be shared with a selected specific terminal. Furthermore, the data input through the second area A2 may be shared in real time and the data input through the fifth area A5 may be shared when the user selects transmission of the data. Accordingly, data transmitted through the private area can be cautiously shared.

Figure 27A:
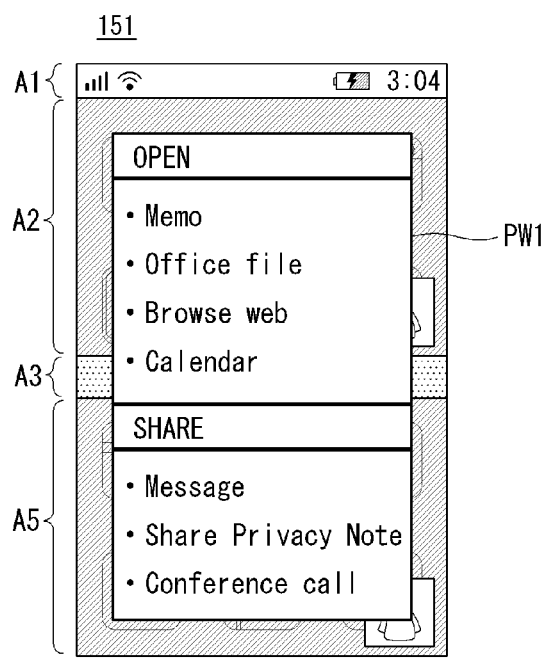

Referring to FIG. 27(a), the controller 180 can display a first pop-up window PW1. The first pop-up window PW1 can provide a menu by which content to be shared through the input area C is selected and/or a menu by which a function to be shared through the input area C is selected. As shown in FIG. 27(a), memo content, message content, calendar content, etc. can be transmitted.

Figure 27B:
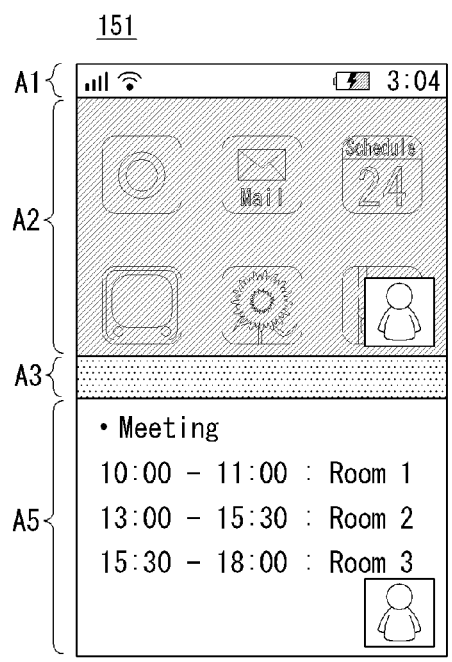

Referring to FIG. 27(b), when the user select the memo content, the controller 180 can display the selected memo content in the input area C. For example, the controller 180 can display the memo content in the fifth area A5.

Figure 28:
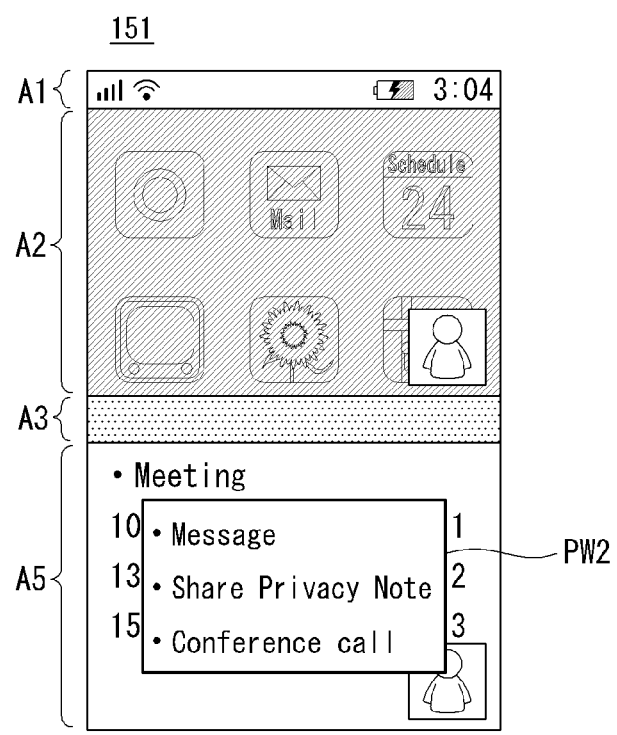

Referring to FIG. 28, the controller 180 can display a second pop-up window (PW2) for selecting a means by which the displayed memo content is shared.

FIGS. 29 and 30 illustrate a procedure of editing a user touch input in the mobile terminal of FIGS. 9A and 9B.

Referring to FIGS. 29A, 29B, 30A and 30B, the mobile terminal 100 according to an embodiment of the present invention can select some or whole of a displayed touch trace corresponding to the touch input.

Figure 29A:
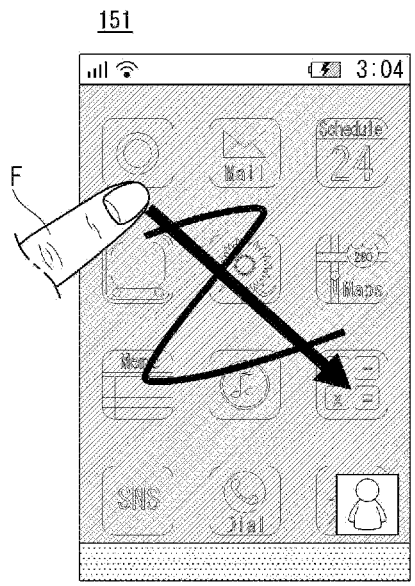
FIGS. 29A, 29B, 30A and 30B illustrate a procedure of editing a user touch input in the mobile terminal of FIGS. 9A and 9B.

Referring to FIG. 29(a), the user can perform a touch action including a touch trace indicated with a finger F.

Figure 29B:
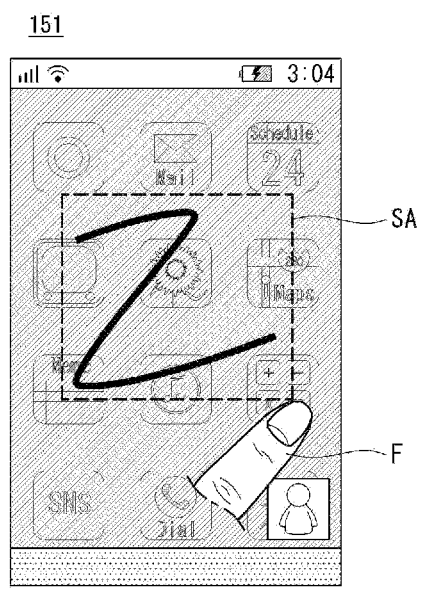

Referring to FIG. 29(b), upon input of the touch trace by the user, the controller 180 can display a selected area SA corresponding to the touch trace. The selected area SA can be indicated by a dotted line or expressed in a color different from other areas. When the selected area SA is displayed, the user can intuitively recognize that a specific area is selected.

Figure 30A:
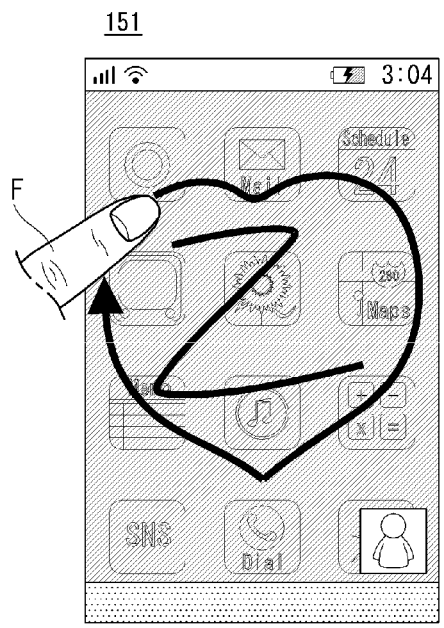

Referring to FIG. 30(a), the user can touch a line surrounding the displayed touch trace.

Figure 30B:
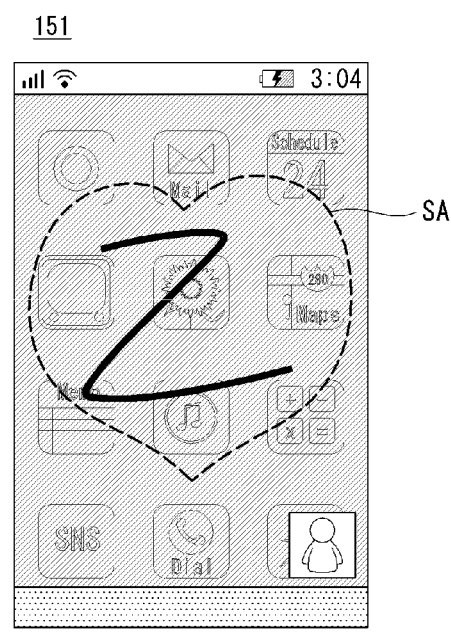

Referring to FIG. 30(b), the controller 180 can display the selected area SA along the line touched by the user. That is, the selected area SA can be displayed in the form of a free curve instead of a square. When a specific area is selected, the controller 180 can selectively store or transmit content corresponding to the specific area.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a memory;
a touchscreen; and
a processor configured to:
cause the touchscreen to display an image corresponding to a screen comprising a plurality of items;
activate a note taking mode in response to a first input which is a dragging from an edge of the touchscreen and that extends toward an opposite edge of the touchscreen;
cause the touchscreen to display an indicator in further response to the first input, wherein the indicator indicates a portion of the image of the screen, wherein an area of the indicator is changed according to a length of the first input dragging from the edge;
cause the touchscreen to display a touch trace image on the image in response to receiving a touch input during the note taking mode, wherein displayed location of the touch trace image generally corresponds to a location of the touchscreen at which the touch input is received;
store in the memory a combined image comprising the touch trace image and at least a portion of the image that is indicated by the indicator;
select a portion of the image that includes a portion of the touch trace image in response to a second input; and
store in the memory a second combined image comprising the portion of the touch trace image and the selected portion of the image.

2. the mobile terminal of claim 1, wherein the portion of the image of the screen indicated by the indicator is an entire portion of the image of the screen.

3. The mobile terminal of claim 1, wherein the portion of the image of the screen indicated by the indicator is less than an entire portion of the image of the screen.

4. The mobile terminal of claim 1, further comprising:
a transmitter; and wherein the processor is further configured to:
cause the combined image to be transmitted via the transmitter to another terminal in real-time.

5. The mobile terminal of claim 1, wherein the screen is an idle screen.

6. The mobile terminal of claim 1, wherein the processor is further configured to:
execute an application in response to a received input, wherein the application includes the screen comprising the plurality of items.

7. The mobile terminal of claim 1, wherein the indicator is a semi-transparent image partially obscuring the portion of the image of the screen.

8. The mobile terminal of claim 1, wherein the processor is further configured to:
cause the touchscreen to display a menu comprising a plurality of configuration options, wherein each option of the plurality of configuration options relates to a displayed characteristic of the touch trace image; and cause the touchscreen to display the touch trace image according to a user-selected option of the plurality of configuration options.

9. The mobile terminal of claim 1, wherein the processor is further configured to:
cause the touchscreen to display a second touch trace image on the image in response to receiving a second touch input during a second note taking mode, wherein displayed location of the second touch trace image generally corresponds to a location of the touchscreen at which the second touch input is received; and
store in the memory a first image comprising the second touch trace image.

10. A method for displaying images on a touchscreen of a mobile terminal, the method comprising:
displaying, on the touchscreen, an image corresponding to a screen comprising a plurality of items;
activating a note taking mode in response to a first input which is a dragging from an edge of the touchscreen and that extends toward an opposite edge of the touchscreen
displaying, on the touchscreen, an indicator in further response to the first input, wherein the indicator indicates a portion of the image of the screen, wherein an area of the indicator is changed according to a length of the first input dragging from the edge;
displaying, on the touchscreen, a touch trace image on the image in response to receiving a touch input during the note taking mode, wherein displayed location of the touch trace image generally corresponds to a location of the touchscreen at which the touch input is received;
storing, in memory, a combined image comprising the touch trace image and at least a portion of the image that is indicated by the indicator;
selecting a portion of the image that includes a portion of the touch trace image in response to a second input; and
storing, in the memory, a second combined image comprising the portion of the touch trace image and the selected portion of the image.

11. The method of claim 10, wherein the portion of the image of the screen indicated by the indicator is an entire portion of the image of the screen.

12. The method of claim 10, wherein the portion of the image of the screen indicated by the indicator is less than an entire portion of the image of the screen.

13. The method of claim 10, further comprising:
transmitting, via a transmitter, the combined image to another terminal in real-time.

14. The method of claim 10, wherein the screen is an idle screen.

15. The method of claim 10, further comprising:
executing an application in response to a received input, wherein the application includes the screen comprising the plurality of items.

16. The method of claim 10, wherein the indicator is a semi-transparent image partially obscuring the portion of the image of the screen.

17. The method of claim 10, further comprising:
displaying, on the touchscreen, a menu comprising a plurality of configuration options, wherein each option of the plurality of configuration options relates to a displayed characteristic of the touch trace image; and
displaying, on the touchscreen, the touch trace image according to a user-selected option of the plurality of configuration options.

18. The method of claim 10, further comprising:
displaying, on the touchscreen, a second touch trace image on the image in response to receiving a second touch input during a second note taking mode, wherein displayed location of the second touch trace image generally corresponds to a location of the touchscreen at which the second touch input is received; and
storing, in the memory, a first image comprising the second touch trace image.

19. The mobile terminal of claim 1, wherein the processor is further configured to activate the note taking mode when a distance of the first input is longer than a predetermined distance.

* * * * *